United States Patent Office 2,772,264
Patented Nov. 27, 1956

2,772,264

FUNGICIDAL COMPOSITION

Charles C. Yeager, Glen Ellyn, Ill., assignor to Scientific Oil Compounding Company, Inc., a corporation of Illinois No Drawing. Application October 29, 1953,
Serial No. 389,159

26 Claims. (Cl. 260—102)

This invention relates to novel metal rosin ammonium phenoxide complex-metal carboxylic acid soap reaction products, and to fungicidal and insecticidal compositions containing the same. More particularly, the invention relates to such reaction products which form solutions having a relatively light color, thereby extending the fields of use thereof.

In my copending application entitled Fungicidal Composition, Serial No. 389,146, filed on even date herewith, I have described and claimed metal rosin ammonium phenoxide complex-metal carboxylic acid soap compounds which are produced by the reaction of a metal rosin ammonium phenoxide complex and a water insoluble metal soap of a carboxylic acid and which possess a high fungicidal activity on plants, textiles, paper, leather, wood, sealers, lacquers, etc. In the treatment of textiles, paper, etc. with these novel compounds or in the incorporation thereof in varnishes, clear lacquers, etc. where the presence of undesirable extraneous colors is a problem, it has been found that many of these compounds tend to impart an objectionally dark color to the treated material. This dark color is particularly troublesome where the metal of the rosin ammonium phenoxide complex which is reacted with a water insoluble carboxylic acid soap, is copper. For example, a solution of my novel reaction product made from a copper rosin ammonium phenoxide complex imparts to textiles treated therewith a blue color. Where it is desired to impart to canvas a khaki color, this blue color creates a dyeing problem.

I have found that if the reaction between the metal rosin ammonium phenoxide complex and the water insoluble carboxylic acid soap is carried out in the presence of a quinoline there is obtained a novel reaction product which has an enhanced fungicidal efficacy and which gives a relatively light colored solution having little hiding power. For example, where before a deep blue colored solution was obtained, solutions of the novel products obtained by carrying out the aforesaid reaction in the presence of a quinoline are of a light green color and textiles treated therewith can be dyed to any desired khaki shade readily.

In general, the novel reaction products of the present invention are prepared by reacting a metal rosin ammonium phenoxide complex with a water insoluble soap of a carboxylic acid in the presence of a quinoline, at an elevated temperature at least sufficient to place the reactants into homogeneous solution. The metal of the complex may be nickel, copper, cobalt, zinc, silver, iron, chromium, mercury or other metal capable of forming a complex with ammonia. The quinoline may be any quinoline, substituted or unsubstituted, such as quinoline, isoquinoline, quinaldine, 4-chloroquinoline, 6-nitroquinoline, 7-nitroquinoline, 6-methoxyquinoline, 8-methoxyquinoline, 2-hydroxyquinoline, 4-methyl-2-hydroxyquinoline, 4-hydroxyquinoline, 2-methyl-4-hydroxyquinoline, 5-hydroxyquinoline, 6-hydroxyquinoline, 7-hydroxyquinoline, 8-hydroxyquinoline, etc. The preferred quinolines are isoquinoline and 8-hydroxyquinoline. The reaction may be carried out at a temperature in the order of about 250° to 400° F. Lower temperatures may be used, but at a sacrifice of time. Higher temperatures, up to the lowest decomposition temperature of the reactants, may be used, if desired.

The proportions of the metal rosin ammonium phenoxide complex and of the water insoluble soap reactants may be varied widely, as desired. Thus, stoichiometrical proportions of these reactants or an excess of one with respect to the other may be used. With respect to the quinoline, the proportions thereof may vary widely, from about 2% to 15% by weight based on the weight of the phenoxide complex reactant.

The metal rosin ammonium phenoxide complex may be introduced as such into the reaction with the water insoluble soap and the quinoline or it may be formed in situ in the reaction mix. The in situ reaction is preferred. In the in situ reaction the rosin ammonium phenoxide may be preformed or it, too, may be formed in situ. The in situ formation of the phenoxide is preferred. Thus, in the preferred procedure, the reaction products of the present invention are formed by the reaction of a water insoluble soap, a quinoline, a rosin amine, a phenol and a water soluble salt of a metal capable of forming a complex with ammonia.

The rosin ammonium phenoxide which may be used in accordance with the present invention may be made by reacting a rosin amine with a simple or substituted phenol as described in Patent No. 2,513,429, granted July 4, 1950. The metal rosin ammonium phenoxide complex which may be used as a reactant in accordance with the present invention may be made by reacting a rosin ammonium phenoxide with a water soluble salt of a metal (nickel, cobalt, iron, aluminum, copper, zinc, mercury, silver, etc.) capable of forming a complex with ammonia. Examples of these soluble salts are copper acetate, zinc acetate, the acetates of the other named metals, and the formate, chloracetate, bromoacetate, chloride, sulfate, borate, carbonate, thiocyanate, etc., salts of metals capable of forming complexes with ammonia.

Examples of the rosin amines which may be used to form the phenoxide reactant of the present invention include the rosin amines made from wood or gum rosin or various modified wood or gum rosins, such as dehydrogenated (disproportionated) rosin, hydrogenated rosin, or polymerized rosin. The rosin amines may also be the amines derived from the pure rosin acids in which abietyl amine is the amine derived from abietic acid, dehydroabietyl amine is the amine derived from dehydroabietic acid, dihydroabietyl amine is the amine derived from dihydroabietic acid, and tetrahydroabietyl amine is the amine derived from tetrahydroabietic acid. And they may be the secondary tertiary rosin amines in which the hydrogens attached to the nitrogen are replaced by lower alkyl and alkylol groups, such as methyl dehydroabietyl amine, ethyl dehydroabietyl amine, dimethyl dehydroabietyl amine, diethyl dehydroabietyl amine, isopropyl dehydroabietyl amine, butyl dehydroabietyl amine, hydroxymethyl dehydroabietyl amine, hydroxyethyl dehydroabietyl amine, and di(hydroxyethyl) dehydroabietyl amine. Similar secondary and tertiary rosin amines having the nucleus of abietic acid, dihydroabietic acid, tetrahydroabietic acid, and polymerized abietic acid may also be used, as may also the other amines referred to in the aforesaid patent.

Examples of phenols which may be used to form the phenoxide reactant of the present invention are phenol, ortho amyl phenol, octyl phenol, nonyl phenol, ortho, meta and para cresol, para chloro meta cresol and other chlorinated cresols, tertiary butyl meta cresol, resorcinol, pyrogallol, xylenol, para tolyl phenol, xylyl phenol, menthyl phenol, cumyl phenol, beta naphthol, chlorinated phenols such as monochlorophenol, dichlorophenol, dichlorophenol, trichlorophenol, tetrachlorophenol, pentachlorophenol, nitrated phenols such as mononitrophenol, dinitrophenol, trinitrophenol, and nitrocresols, and the like.

The water insoluble soaps of carboxylic acids which are used as reactants in accordance with the present invention are water-insoluble soaps of a metal or a mixture of metals and a soap-forming acid or a mixture of such acids. Thus, the soaps may be soaps of calcium, barium, magnesium, mercury, lead, cadmium, silver, thallium, manganese, cobalt, nickel, iron, copper, tin, aluminum and the like. The preferred soaps are the copper, zinc and nickel soaps because the results obtained with these soaps are superior to those obtainable with the other soaps referred to herein.

The soap-forming acids used in forming the aforesaid water-insoluble metal soaps include monocarboxylic acids having at least 6 carbon atoms in the carboxylic acid and being not otherwise substituted than with a hydrocarbon radical and the hydroxyl radical, such as caproic acid, caprylic acid, capric acid, lauric acid, myristic acid, palmistic acid, stearic acid, oleic acid, linoleic acid, linolenic acid, palmitoleic acid, melissic acid, hydroxystearic acid, ricinoleic acid, and the like, and mixtures thereof. The preferred soap-forming fatty acids or materials are those saturated and unsaturated higher aliphatic acids containing from twelve to eighteen carbon atoms, and rosin. Other soap-forming fatty acids which may be used in forming the metal soaps used in accordance with the present invention are the mixed higher fatty acids derived from animal or vegetable sources such as, for example, sardine and other fish oils, lard, coconut oil, sesame oil, soybean oil, tung oil, corn oil or partially or completely hydrogenated derivatives of such oils, fatty acids derived from carnauba, spermaceti, beeswax, candelilla wax and like waxes, and carboxylic acids derived from petroleum or other hydrocarbons. Other soap-forming acids which may be used are naphthenic acid, tall oil fatty acids, and hydroaromatic acids such as abietic acid and the like.

The following examples are illustrative of the preferred method which may be used to form the reaction products of the present invention. In the examples the term "parts" refers to parts by weight.

*Example 1*

70 parts of magnesium acetate were added with stirring to 100 parts of 2-ethylhexoic acid at a temperature of 350° to 420° F. The heating and agitation were continued until the acetic acid liberated by the reaction was vaporized. The addition of 5 parts 8-hydroxyquinoline, 100 parts of nonyl phenol and 100 parts of dehydroabietyl amine caused the temperature to drop to 260° F. At this point 55 parts of copper acetate were added and the temperature was raised to 340° F., where it was maintained for 15 minutes, whereupon a clear solution was obtained and heating discontinued. When the temperature dropped to 175° F., 235 parts of xylol were added. The resulting composition was liquid at room temperature.

The composition of Example 1 was tested to determine its fungicidal activity by treating duck samples with a xylol solution containing 5% of the reaction product, as follows:

Samples of 10 oz. specification army duck were cut into 10" x 30" pieces and the pieces were washed in soap suds, rinsed and dried. The dried pieces were passed through the testing solution so that complete penetration was obtained. They were then passed through a wringer to remove the excess solution. Approximately a 50% wet-pickup was obtained. The treated fabric pieces were then dried for 24 hours to obtain complete solvent release. The dried fabric pieces had a light green color.

The treated and dried pieces of duck were leached for 24 hours in running water and buried horizontally in a well composted soil consisting of 50% black loam and 50% pre-rotted manure, one-half inch below the soil surface. The moisture content of the soil was maintained at approximately 30–50%.

After 28 days' incubation in the soil bed, the fabric pieces were removed and examined. There was no evidence of degradation found in the treated fabric pieces after burial and they had retained their original "hand" characteristics. A control 10" x 30" sample of the aforesaid army duck containing no treatment was buried at the same time as the treated pieces and under the same conditions. The control was completely destroyed, being in the form of small deteriorated pieces at the conclusion of the 28 day test period.

Prior to impregnating the piece of duck with the solution of Example 1, it and the untreated piece of duck were tested for tensile strengths on a 500 lb. vertical Scott tester. Each had a tensile strength of 296 lbs. After the 28 day burial period the treated duck and the control piece were removed from the soil, washed thoroughly in warm water to remove all soil particles and airdried at room temperature. Tensile strength on the treated piece was then taken on the same Scott tester. It had a tensile strength of 298 lbs. The control piece was removed from the soil in small deteriorated pieces which had lost their fabric strength and hence were not tested. Each of these small pieces was badly stained. In contrast the treated piece was substantially free from stain.

*Example 2*

Example 1 was repeated except that 25 parts of isoquinoline were used in lieu of the 8-hydroxyquinoline. A test solution and fabric pieces were made up and tested against an untreated fabric control piece, as described. The treated pieces showed no sign of degradation and no loss of "hand," whereas the control piece had completely deteriorated.

*Example 3*

Example 1 was repeated except that 100 parts of phenol were used in lieu of the nonyl phenol. A test solution and fabric pieces were made up and tested against an untreated fabric control piece, as described. The treated pieces showed no sign of degradation and no loss of "hand," whereas the control piece had completely deteriorated.

*Example 4*

Example 1 was repeated except that 100 parts of dihydroabietyl amine were used in lieu of the dehydroabietyl amine and 30 parts of quinoline were used in lieu of the 8-hydroxyquinoline. A test solution and fabric pieces were made up and tested against an untreated fabric control piece, as described. The treated pieces showed no sign of degradation and no loss of "hand," whereas the control piece had completely deteriorated.

*Example 5*

Example 1 was repeated except that 30 parts of 8-methoxyquinoline were used in lieu of the 8-hydroxyquinoline. A test solution and fabric pieces were made up and tested against an untreated fabric control piece, as described. The treated pieces showed no sign of degradation and no loss of "hand," whereas the control piece had completely deteriorated.

*Example 6*

Example 1 was repeated except that a corresponding amount of nickel 2-ethylhexoate was used in lieu of the soap of Example 1 and 30 parts of 4-chloroquinoline were used in lieu of the 8-hydroxyquinoline. A test solution and fabric pieces were made up and tested against an untreated fabric control piece, as described. The treated pieces showed no sign of degradation and no loss of "hand," whereas the control piece had comletely deteriorated.

*Examples 7, 8, 9 and 10*

Example 1 was repeated except that 55 parts of zinc acetate were used in lieu of the copper acetate. Example 1 was repeated except that 55 parts of mercury carbonate were used in lieu of the copper acetate. Example 1 was repeated except that 55 parts of nickel chloroacetate were used in lieu of the copper acetate. Example 1 was repeated except that 55 parts of silver acetate were used in lieu of the copper acetate. Test solutions of these double salts and fabric pieces treated therewith were made up and tested against an untreated fabric control piece, as described. The treated pieces showed no sign of degradation and no loss of "hand," whereas the control piece had completely deteriorated.

The reaction products of each of Examples 1 to 10, inclusive, in the form of the solutions described, were individually applied to wood samples 1" x 3" and leather squares 2" x 2" by soaking under vacuum for 20 minutes and drying for 6 hours. The treated specimens and untreated control specimens of similar dimensions were placed on a sterile nutrient agar medium with a pH of 5.5, which was used for the substratum in the petridishes in which the specimens were placed. Each treated specimen and a control specimen were placed in a single petridish. The specimens in each of these dishes were sprayed with a spore suspension of the following organisms and incubated at 30° C. for 14 days: *Chaetomium globosum, Penicillium citrinum, Aspergillus niger, Aspergillus ferreus, Trichoderma viride,* and *Aspergillus flavus.*

At the conclusion of this test period it was found that fungi were growing over the entire surface of the leather and wood control specimens and that no growth existed on the treated wood and leather specimens.

The reaction products of the present invention can be used to treat textiles, paper, leather and the like by impregnating or coating these materials with a solution or dispersion of the reaction product in a suitable vehicle. Thus, the solutions described above may be used to treat these materials. These solutions may be compounded with resins, animal, vegetable and fish oils, plasticizers, flameproofing agents, driers, antioxidants and the like, in accordance with known techniques, to impart to the solutions desired properties. For example, characteristics such as spread and flow of these solutions may be modified by the addition thereto of a fatty acid such as lauric acid, oleic acid, linseed oil fatty acids, hempseed oil fatty acids and like fatty acids having from 8 to 20 carbon atoms in the chain, and of a fatty acid glyceride, either raw or treated, such as raw or bodied linseed oil, China wood oil, castor oil, dehydrated castor oil, and the like. Compatible natural and synthetic resins such as rosin, phenol-aldehyde resins, urea-aldehyde resins, vinyl resins and the like, or compatible cellulose derivatives such as nitrocellulose, cellulose, cellulose acetate, ethyl cellulose and the like may be incorporated in the solutions in varying proportions to meet any desired needs.

Plasticizers such as glycol, glycerine, pentaerythritol, sorbitol, mannitol and other compatible plasticizers may be added to the solutions. Suitable anti-oxidants which may be added to the solution are phenyl salicylate, tertiary butyl catechol and guaiacol, and suitable driers are zinc naphthenate, lead naphthenate, cobalt naphthenate and zinc octoate.

If it is desired to impart water-proof properties to the solutions of the reaction products of the present invention, various waxes such as paraffin wax, beeswax, carnauba wax, spermaceti wax, synthetic waxes, and the like, may be incorporated in the solutions in varying proportions to meet the desired needs.

By a proper choice of the solvents for the reaction products of the present invention and of suitable modifying agents, the resulting liquid compositions may be controlled as to consistency, drying time, flow, penetration, and the like.

Other solvents for the reaction products of the present invention are toluol, benzol, carbon tetrachloride, mineral spirits, naphtha, acetone, and the like.

Compositions containing reaction products of the present invention not only inhibit the growth of fungus organisms but may also kill the activity of all existing fungus growth on contact. Textiles, leather, wood, resins, etc., which have been treated with the reaction products of the present invention are not attacked to any appreciable extent by soil animal life and these treated materials resist the action of bacteria and insects. The reaction products of the present invention lend themselves for use as insecticides, in either dry or liquid form, and for preventing and combating diseases of plant life, both those diseases which attack the parts of plants above ground and diseases such as rot which attack underground parts of the plants. In dry form the active ingredient is mixed with an inert diluent such as bentonite, kieselguhr, talc, etc.

While the present invention has been described in connection with certain specific examples of methods of making the reaction products, it is obvious that my invention is not to be construed as limited to the specific materials disclosed in these examples or to the details of the methods set forth therein, since changes in materials, proportions and method details may be made without departing from the scope of my invention as defined in the appended claims.

I claim:

1. The method of forming a composition of matter comprising heating at an elevated temperature sufficient to place the reactants into homogeneous solution, said temperature being below the lowest decomposition temperature of the reactants, a metal rosin ammonium phenoxide complex, the metal of said complex being from a water-soluble metal capable of forming a complex with ammonia, a water-insoluble mono-carboxylic acid soap having at least 6 carbon atoms in the carboxylic acid, said carboxylic acid being not otherwise substituted than with a hydrocarbon radical and the hydroxyl radical and a quinoline.

2. The product produced by the method of claim 1.

3. The method of forming a composition of matter comprising heating at an elevated temperature sufficient to place the reactants into homogeneous solution, said temperature being below the lowest decomposition temperature of the reactants, copper rosin ammonium phenoxide complex, a water-insoluble mono-carboxylic acid soap having at least 6 carbon atoms in the carboxylic acid, said carboxylic acid being not otherwise substituted than with a hydrocarbon radical and the hydroxyl radical and a quinoline selected from the class consisting from quinoline, isoquinoline, quinaldine, a hydroxyquinoline, nitroquinoline, chloroquinoline and methoxyquinoline.

4. The product produced by the method of claim 3.

5. The method of forming a composition of matter comprising heating at an elevated temperature sufficient to place the reactants into homogeneous solution, said temperature being below the lowest decomposition temperature of the reactants, copper rosin ammonium phenoxide complex, a water-insoluble mono-carboxylic acid soap having at least 6 carbon atoms in the carboxylic acid, said carboxylic acid being not otherwise substituted than with a hydrocarbon radical and the hydroxyl radical and 8-hydroxyquinoline.

6. The product produced by the method of claim 5.

7. The method of forming a composition of matter comprising heating at an elevated temperature sufficient to place the reactants into homogeneous solution, said temperature being below the lowest decomposition temperature of the reactants, copper rosin ammonium phenoxide complex, a water-insoluble mono-carboxylic acid soap having at least 6 carbon atoms in the carboxylic acid, said carboxylic acid being not otherwise substituted than with a hydrocarbon radical and the hydroxyl radical and isoquinoline.

8. The product produced by the method of claim 7.

9. The method of forming a composition of matter comprising heating at an elevated temperature sufficient to place the reactants into homogeneous solution, said temperature being below the lowest decomposition temperature of the reactants, copper rosin ammonium phenoxide complex, a water-insoluble mono-carboxylic acid soap having at least 6 carbon atoms in the carboxylic acid, said carboxylic acid being not otherwise substituted than with a hydrocarbon radical and the hydroxyl radical and quinoline.

10. The product produced by the method of claim 9.

11. The method of forming a composition of matter comprising heating at an elevated temperature sufficient to place the reactants into homogeneous solution, said temperature being below the lowest decomposition temperature of the reactants, copper rosin ammonium phenoxide complex, a water-insoluble mono-carboxylic acid soap having at least 6 carbon atoms in the carboxylic acid, said carboxylic acid being not otherwise substituted than with a hydrocarbon radical and the hydroxyl radical and hydroxyquinoline.

12. The method of forming a composition of matter comprising heating at an elevated temperature sufficient to place the reactants into homogeneous solution, said temperature being below the lowest decomposition temperature of the reactants, copper rosin ammonium phenoxide complex, a water-insoluble mono-carboxylic acid soap having at least 6 carbon atoms in the carboxylic acid, said carboxylic acid being not otherwise substituted than with a hydrocarbon radical and the hydroxyl radical and quinaldine.

13. The method of forming a composition of matter comprising heating at an elevated temperature sufficient to place the reactants into homogeneous solution, said temperature being below the lowest decomposition temperature of the reactants, copper rosin ammonium phenoxide complex, a water-insoluble mono-carboxylic acid soap having at least 6 carbon atoms in the carboxylic acid, said carboxylic acid being not otherwise substituted than with a hydrocarbon radical and the hydroxyl radical and 4-chloroquinoline.

14. The method of forming a composition of matter comprising heating at an elevated temperature sufficient to place the reactants into homogeneous solution, said temperature being below the lowest decomposition temperature of the reactants, copper rosin ammonium phenoxide complex, a magnesium carboxylic acid soap and a quinoline selected from the class consisting from quinoline, isoquinoline, quinaldine, a hydroxyquinoline, nitroquinoline, chloroquinoline and methoxyquinoline.

15. The product produced by the method of claim 14.

16. The method of forming a composition of matter comprising heating at an elevated temperature sufficient to place the reactants into homogeneous solution, said temperature being below the lowest decomposition temperature of the reactants, copper rosin ammonium phenoxide complex, a magnesium carboxylic acid soap and 8-hydroxyquinoline.

17. The product produced by the method of claim 16.

18. The method of forming a composition of matter comprising heating at an elevated temperature sufficient to place the reactants into homogeneous solution, said temperature being below the lowest decomposition temperature of the reactants, copper rosin ammonium phenoxide complex, a magnesium carboxylic acid soap and isoquinoline.

19. The product produced by the method of claim 18.

20. The method of forming a composition of matter comprising heating at an elevated temperature sufficient to place the reactants into homogeneous solution, said temperature being below the lowest decomposition temperature of the reactants, copper rosin ammonium phenoxide complex, a magnesium carboxylic acid soap and quinoline.

21. The product produced by the method of claim 20.

22. The method of forming a composition of matter comprising heating at an elevated temperature sufficient to place the reactants into homogeneous solution, said temperature being below the lowest decomposition temperature of the reactants, copper rosin ammonium phenoxide complex, a magnesium carboxylic acid soap and an hydroxyquinoline.

23. The method of forming a composition of matter comprising heating at an elevated temperature sufficient to place the reactants into homogeneous solution, said temperature being below the lowest decomposition temperature of the reactants, a rosin amine, a phenol, a water-soluble salt of a metal capable of forming a complex with ammonia, a water-insoluble mono-carboxylic acid soap having at least 6 carbon atoms in the carboxylic acid, said carboxylic acid being not otherwise substituted than with a hydrocarbon radical and the hydroxyl radical and a quinoline selected from the class consisting from quinoline, isoquinoline, quinaldine, a hydroxyquinoline, nitroquinoline, chloroquinoline and methoxyquinoline.

24. The method of forming a composition of matter comprising heating at an elevated temperature sufficient to place the reactants into homogeneous solution, said temperature being below the lowest decomposition temperature of the reactants, dehydroabietyl amine, nonyl phenol, copper acetate, magnesium 2-ethylhexoate and 8-hydroxyquinoline.

25. The product produced by the method of claim 24.

26. The method of forming a composition of matter comprising heating at an elevated temperature sufficient to place the reactants into homogeneous solution, said temperature being below the lowest decomposition temperature of the reactants, dehydroabietyl amine, nonyl phenol, copper acetate, magnesium 2-ethylhexoate and isoquinoline.

References Cited in the file of this patent

UNITED STATES PATENTS

| | | |
|---|---|---|
| 2,490,924 | Schertz | Dec. 13, 1949 |
| 2,490,925 | Schertz | Dec. 13, 1949 |
| 2,492,939 | Schertz | Dec. 27, 1949 |
| 2,513,429 | Rosher | July 4, 1950 |
| 2,623,870 | Sanders | Dec. 30, 1952 |